H. WEINHAGEN.

Assignor to C. A. TATUM.

THERMOMETER TUBE.

No. 10,274. Reissued Jan. 16, 1883.

Witnesses

John M. Spear.

Harry M. Dick

Inventor:

Henry Weinhagen by his attorneys

Bakewell & Betts

UNITED STATES PATENT OFFICE.

HENRY WEINHAGEN, OF HOBOKEN, NEW JERSEY, ASSIGNOR TO CHARLES ALBERT TATUM, OF NEW YORK, N. Y.

THERMOMETER-TUBE.

SPECIFICATION forming part of Reissued Letters Patent No. 10,274, dated January 16, 1883.

Original No. 233,586, dated October 19, 1880. Application for reissue filed October 6, 1881.

*To all whom it may concern:*

Be it known that I, HENRY WEINHAGEN, of Hoboken, in the county of Hudson and State of New Jersey, have invented certain new and useful Improvements in Thermometer-Tubes, of which the following is a specification.

The object of my invention is to produce a thermometer-tube wherein the appearance of the column of mercury and the graduations of the thermometric scale marked thereon will be enlarged or magnified, so that they can be readily seen, and, moreover, to so construct the tube as to preclude it from rolling.

The invention consists in a thermometer-tube having a flat bore, a flat back, and sides forming acute angles with said back, and converging toward each other at an acute angle opposite said flat bore, so as to form a prismatic front, said tube being not liable to roll, and the flat bore and prismatic front contributing to conspicuously display the column of mercury.

Figure 1:
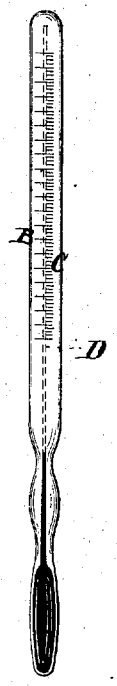
Figure 2:
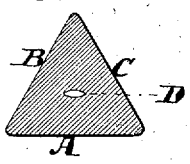

In the accompanying drawings, Figure 1 is a face view of a thermometer-tube embodying my invention, and Fig. 2 is a transverse section of the same upon an enlarged scale.

Similar letters of reference designate corresponding parts in both figures.

The thermometer-tube is triangular in shape, and has a flat back, A, which will rest against any support on which it may be placed or to which it may be attached, and will preclude it from rolling thereon. It also forms a surface on which the graduation of the thermometric scale can be easily and accurately marked by scratching, etching, or otherwise.

B and C designate respectively the two sides of the tube, which join the back at acute angles, and which converge toward the front at an acute angle opposite the bore D. The tube forms a prismatic portion or front, which spreads or laterally enlarges the appearance of the column of mercury or like material in the bore and the thermometric graduations and enables them to be seen without trouble. The bore is flat or elliptical, and arranged with its broad side toward the front, so as to be as prominently in view as possible, and contributing, with the prismatic front, to prominently display the column of mercury. The prismatic front and the flat bore together serve to render the column of mercury, even when very small, very perspicuous.

The thermometer-tube is made as follows: A cylindrical tube with a cylindrical bore is first made in the usual manner. Then the tube is flattened by pressure, so as to produce the flat bore. Then more glass is added to make the circumference cylindrical without altering the bore. The tube, being still in a semi-plastic condition, is now placed into a V-shaped trough, and will, by contact therewith, receive two flat sides. It is then lifted and turned and placed once more into the trough to form the third flat side; but the glass is not sufficiently plastic to fill the angle of the trough. If it did, it would destroy the bore. Hence the angles remain slightly rounded.

What I claim as my invention, and desire to secure by Letters Patent, is—

A thermometer-tube having a flat bore, a flat back, and sides forming acute angles with said back, and converging toward each other at an acute angle opposite said flat bore, so as to form a prismatic front, said tube being not liable to roll, and the flat bore and prismatic front contributing to conspicuously display the column of mercury, substantially as specified.

H. WEINHAGEN.

Witnesses:

JAMES H. HUNTER,

E. S. MAILLER.